UNITED STATES PATENT OFFICE.

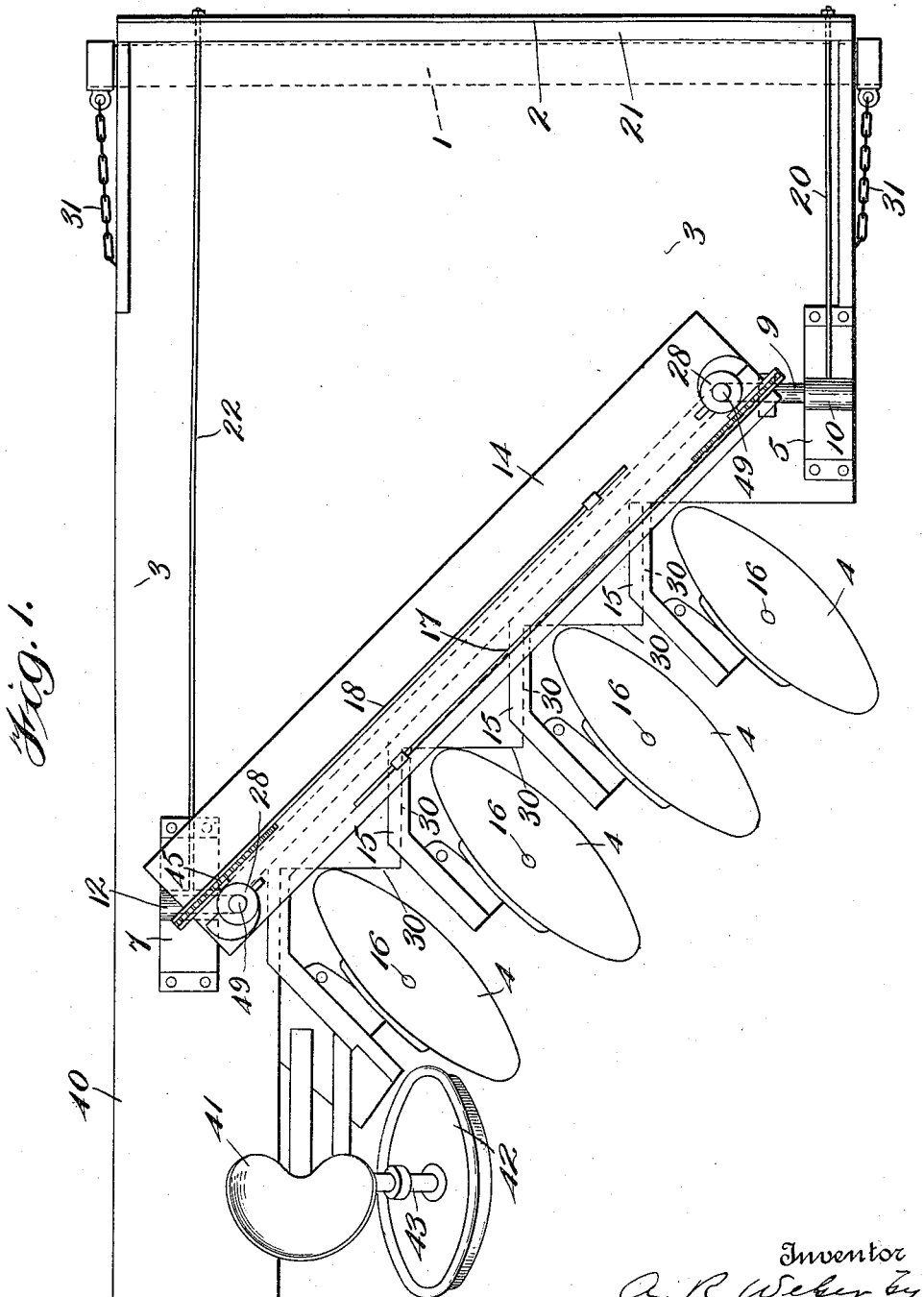

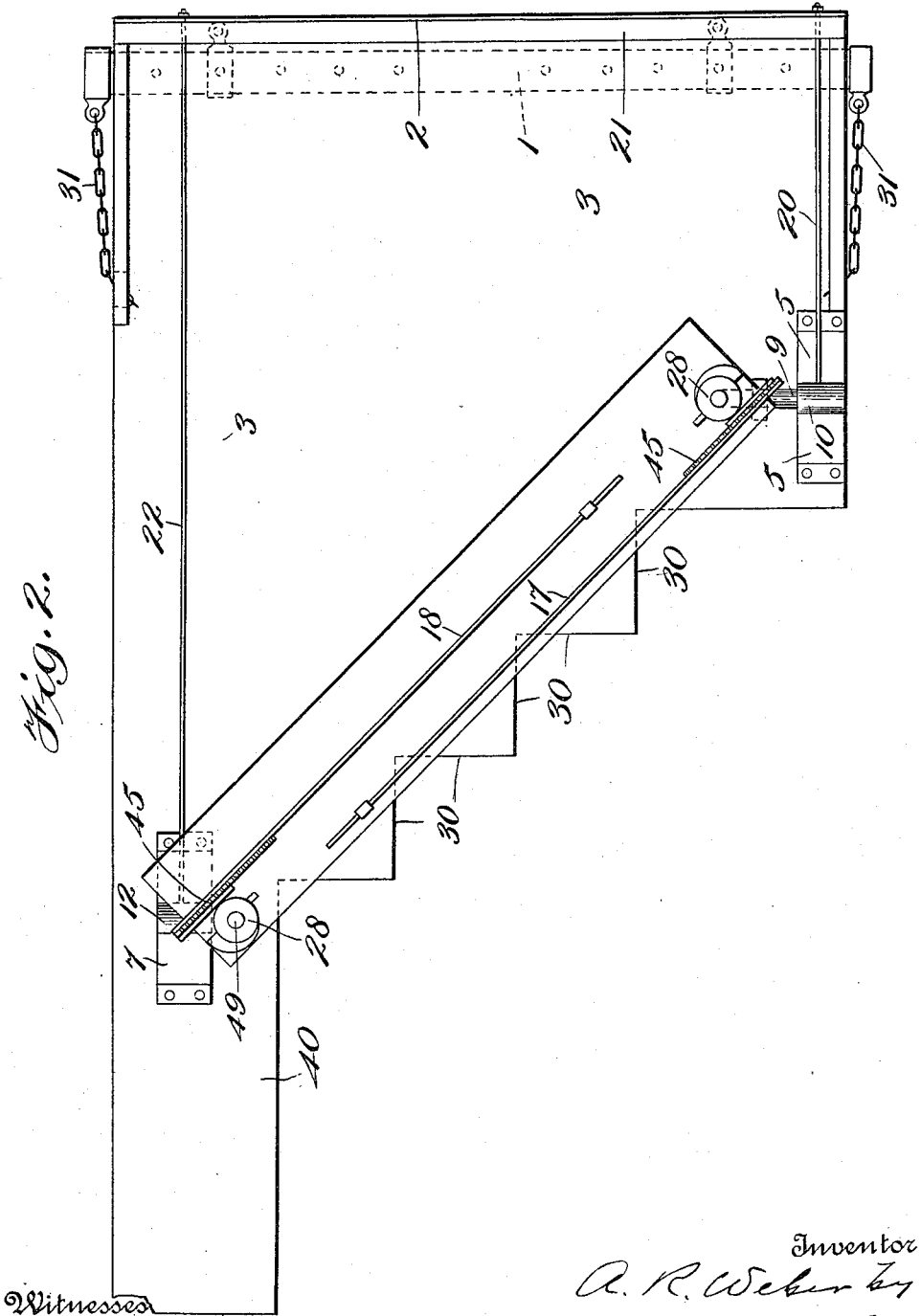

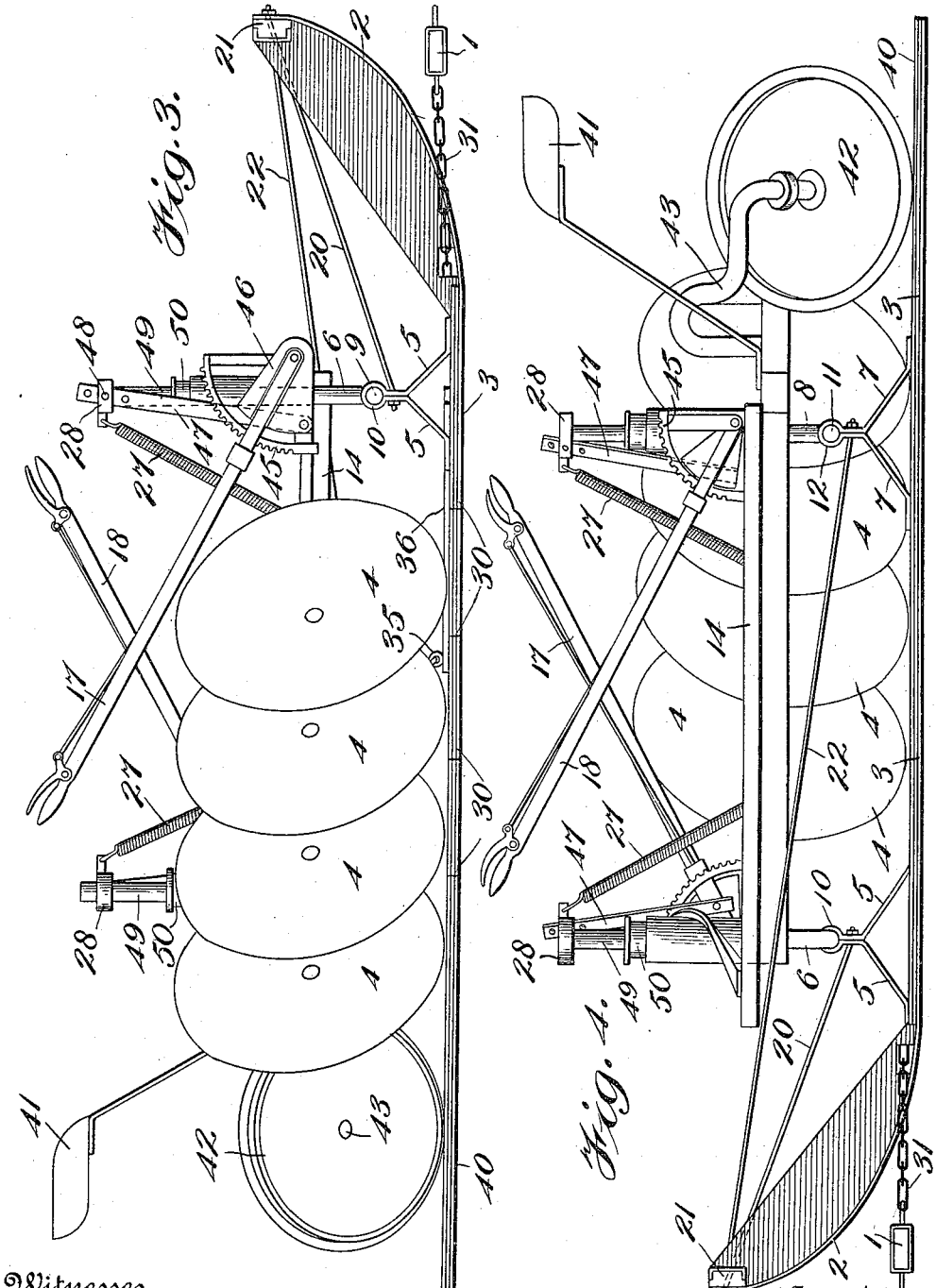

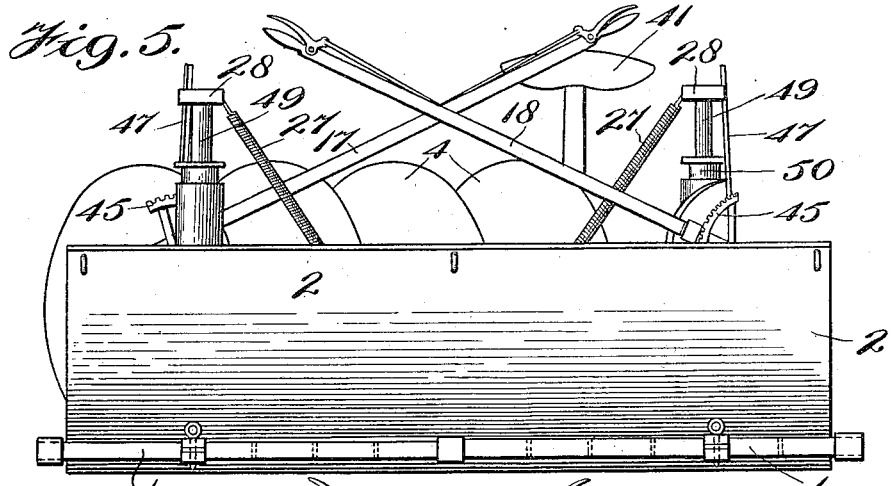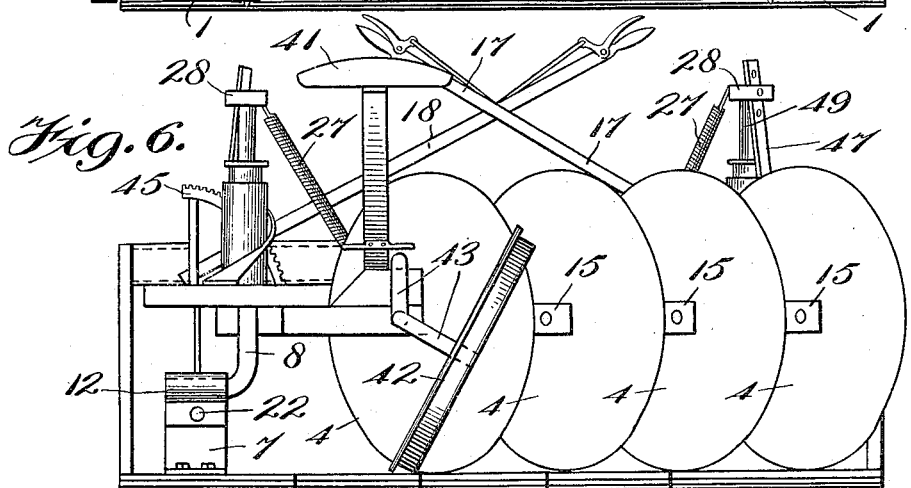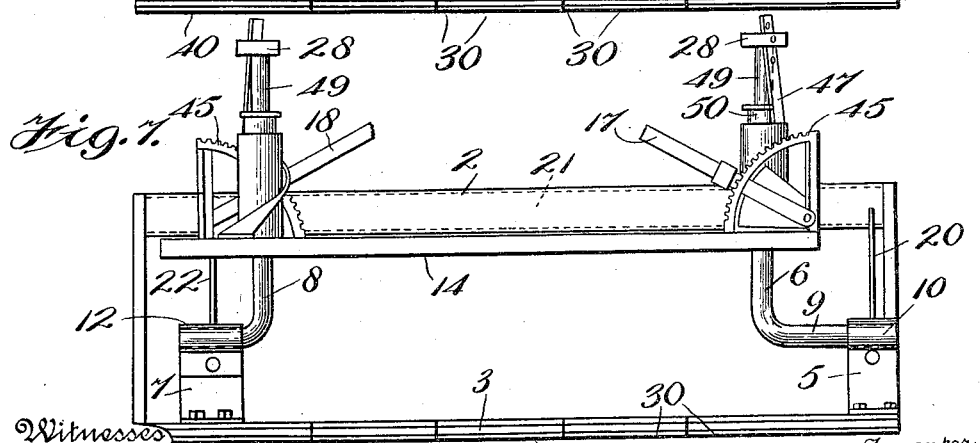

ARNOLD RANDOLPH WEBER, OF PONTCHARTRAIN GROVE, LOUISIANA, ASSIGNOR TO SYMMES & MEANS, A COPARTNERSHIP FORMED BY LESLIE W. SYMMES AND THOMAS H. MEANS, OF SAN FRANCISCO, CALIFORNIA, AS FIRM OF SYMMES & MEANS.

BOAT-SLED DISK PLOW.

1,174,916.  Specification of Letters Patent.  Patented Mar. 7, 1916.

Application filed January 22, 1915. Serial No. 3,765.

*To all whom it may concern:*

Be it known that I, ARNOLD RANDOLPH WEBER, a citizen of the United States, residing at Pontchartrain Grove, in the parish of Orleans and State of Louisiana, have invented certain new and useful Improvements in Boat-Sled Disk Plows; and I do hereby declare the following to be a full, clear, and exact description of the invention, such as will enable others skilled in the art to which it appertains to make and use the same.

This invention relates to disk plows of the boat sled type, and has for its object to provide a plow of this nature which will be more efficient in cultivating swamp lands than those that have been heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—Figure 1 is a plan view of a boat sled plow made in accordance with my invention, showing the disks in place; Fig. 2 is a similar view to Fig. 1 showing the frame work of the plow with the disks and certain other parts omitted; Fig. 3 is a side elevational view of the plow with the disks raised into their inoperative positions; Fig. 4 is a view similar to Fig. 3, but taken from the opposite side of the plow; Fig. 5 is a front end elevational view of the parts shown in Fig. 4; Fig. 6 is a rear end elevational view of the parts shown in Fig. 5; and Fig. 7 is a rear end elevational view of the parts shown in Fig. 2.

I prefer to draw the plow over marshy lands by means of a suitable traction engine, but of course any other motive power may be used.

Referring to the drawings 1 represents any suitable draw bar which may be attached to any suitable motive power as above stated, and 2 represents the bow of the sled or frame work of the plow, which bow is preferably turned up as shown, so as to enable it to easily slide over the soft ground, and at the same time to crush down any weeds or like growths through which the plow is being pulled. The flat bottom 3 of the sled not only serves to support the weight of the plow proper, but it further serves to flatten out or mat down said weeds or growths, and it also partially holds them in their flattened condition while they are being cut and plowed under by the disks 4, as will appear below.

Mounted on the upper side of the bottom 3 near the bow 2 as by the brackets 5 is a beam supporting member 6, and also mounted on the top side of said bottom near its rear end as by similar brackets 7 is a second beam supporting member 8. The beam supporting member 6 is conveniently bent to form an end 9 fitting an eye or collar 10 rigid with the brackets 5, and the supporting member 8 is likewise conveniently provided with a bent end 11 fitting a similar eye or collar 12 which is rigid with the brackets 7 as will be clear from the drawings.

A beam 14 of any suitable construction is supported from the members 6 and 8 by any suitable means, and to said beam may be attached the plow disks 4 in any suitable manner, as for example, by the brackets 15 provided with the axle 16, on which said plow disks 4 are mounted. The said beam 14 together with the disks 4 may be raised and lowered by any suitable well known means, as by the hand levers 17 and 18 connected to said beam and supporting members 6 and 8 as shown. Since the bow 2 of the sled is subjected to considerable strains, there is provided a brace bar 20 which extends from the bar (secured across the upper edge of the bow 2) to the brackets 5; and also extending from said cross bar 21 to the brackets 7 is the companion brace bar 22.

27 represents springs attached at one end to the beam 14 and at their other end to the rising and falling cap member 28, so as to aid in raising the beam and disks.

30 represents staggered, cut-away places in the bottom 3, to permit each disk 4 to follow a separate cut, and to occupy a position only an inch or so away from said bottom 3. This construction enables said disks to cut through the weeds, trash, or other matter which may have been crushed down by the bow 2 and bottom 3, and while the said material is still held in its crushed down condition under said bottom. The feature just stated is an important portion of this invention, and in order that it may be more clearly understood it is said: The draw bar 1 as plainly illustrated in the figures preferably extends across the bow 2 and is attached to the sides of the sled as by the chains 31 or other attachments, so that the connection with the traction engine or other motive power not shown, may be such that no side pull is had, while the said weeds are effectively pressed down and crushed under said bow and bottom 3 as the sled passes over them. During this operation the staggered or stair places 30 permit the disks to cut said weeds, trash etc., before they are completely released, and at the same time said staggered cut-away portions 30 permits the disks to plow the ground and to turn the weeds under, all in such a manner that no weeds or trash collects between the sled and disks, and therefore a clean plowing action is assured.

40 represents a rear extension of the sled bottom 3, 41 represents any suitable seat, 42 any desirable furrow wheel, and 43 any suitable means for supporting said wheel.

45 represents any suitable segment secured to beam 14 with which the levers 17 and 18 are adapted to engage, 46 any suitable connection between the levers 17 and 18 and the reciprocating links 47, while 48 represents an adjustable connection between said links 47 and the reciprocating cap members 28.

49 represents reciprocating members attached to the cap members 28 and slidably mounted in the tubular members 50.

It will be observed that the construction of the sled framework is such that almost any standard disk plow may be readily deprived of its wheels and attached to said sled, simply by reversing its rear lever, and that the sled disk plow thus formed may be readily attached behind a caterpillar engine and plow on newly reclaimed land wherever the engine will go. These plows have been found in actual use to stay on the surface of the ground and to do real plowing in very soft land. By crushing down the weeds and underbrush and turning the same under, they greatly reduce the expense of clearing newly reclaimed ground, and when submerged logs are encountered it is found that the sled will ride over the same without injuring the plow. In fact it has been demonstrated that no trash or weeds gather behind the sled and disks, that clean plowing is had under the circumstances stated above, and that this plow does efficient work where it is impossible for a horse or mule to stand up. Further, it has been found that by taking off the usual disk cleaners that are employed in standard disk plows, one is enabled to throw a rough furrow so that land can be aerated and dried out, while when smooth plowing is desired the disk cleaners can be replaced and smooth clean furrows made.

It is obvious that those skilled in the art may vary the details of construction as well as arrangement of parts without departing from the spirit of the invention, and therefore it is not wished to limit this invention to the above disclosure except as may be required by the claims.

What I claim is:—

1. In a boat sled disk plow the combination of turned up bow and flat bottom members adapted to crush weeds and growths; staggered cutaway portions on said bottom member; plow disks positioned for operation in proximity to said cutaway portions; a beam for supporting said disks; and means to raise and lower said beam and disks, substantially as described.

2. In a boat sled disk plow the combination of a turned up bow member; a flat bottom member; brackets secured to said bottom member; a beam supported by said brackets; bracing means extending from said brackets to said bow member; a plurality of plow disks supported from said beam; and a furrow wheel supported from said beam, substantially as described.

3. In a boat sled disk plow the combination of a turned up bow member; a flat bottom member; a draw bar attached to each side of said bow member; staggered cutaway portions on the rear end of said bottom member; plow disks adapted to coact with said cutaway portions to cut up and turn under weeds; and means to raise and lower said disks, substantially as described.

4. In a boat sled disk plow the combination of a turned up bow member; a continuous flat bottom member; a draw bar attached to each side of said bow member; staggered cutaway portions on the rear end of said bottom member; an extension member carried by the rear end of said bottom member; a furrow wheel located near said extension member; plow disks positioned to coact with said cutaway portions to cut up and turn under weeds; and means to raise and lower said disks, substantially as described.

In testimony whereof I affix my signature, in presence of two witnesses.

ARNOLD RANDOLPH WEBER.

Witnesses:
E. V. E. HARRIS,
J. G. FRENTZ.